United States Patent [19]

Heft

[11] Patent Number: 4,749,226

[45] Date of Patent: Jun. 7, 1988

[54] BOX-LIKE UTILITY STORAGE APPARATUS FOR PICK-UP TRUCKS

[76] Inventor: Henry R. Heft, 2528 N. 22nd Ave., Phoenix, Ariz. 85009

[21] Appl. No.: 933,104

[22] Filed: Nov. 20, 1986

[51] Int. Cl.$^4$ ............................................. B60R 5/04
[52] U.S. Cl. ................................................ 296/37.6
[58] Field of Search ................... 296/37.6, 1 S, 37.16, 296/37.5, 50, 51, 52, 55

[56] References Cited

U.S. PATENT DOCUMENTS

| | | | |
|---|---|---|---|
| 85,096 | 12/1868 | Hotchkiss | 296/52 |
| 3,326,595 | 6/1967 | Ogilvie | 296/37 |
| 3,326,596 | 6/1967 | LaSpina | 296/37.16 |
| 3,664,704 | 5/1972 | Ellis | 296/24 R |
| 4,215,896 | 8/1980 | Drouin | 296/24 R |
| 4,451,075 | 5/1984 | Canfield | 296/37.6 |
| 4,506,870 | 3/1985 | Penn | 296/37.6 |
| 4,573,730 | 3/1986 | Gondert et al. | 296/1 S |
| 4,585,263 | 4/1986 | Hesner | 296/1 S |
| 4,585,265 | 4/1986 | Mader | 296/1 S |
| 4,635,992 | 1/1987 | Hamilton et al. | 296/37.6 |

FOREIGN PATENT DOCUMENTS 3332695  3/1985  Fed. Rep. of Germany ... 296/37.16

Primary Examiner—Johnny D. Cherry
Assistant Examiner—Carol L. Olson
Attorney, Agent, or Firm—Warren F. B. Lindsley

[57] ABSTRACT

A pick-up truck having a box-like utility storage enclosure formed by two hingedly connected rectangular panels and portions of the pick-up truck has channel-forming assemblies on opposite sides of the bed for slidably retaining a first panel. Another embodiment provides a recess in the truck floor for storage of the folded panels while a third embodiment provides a third panel which is vertical and of a mesh-like substance which permits light and air to enter the enclosure when the tailgate is in a horizontal position.

8 Claims, 3 Drawing Sheets

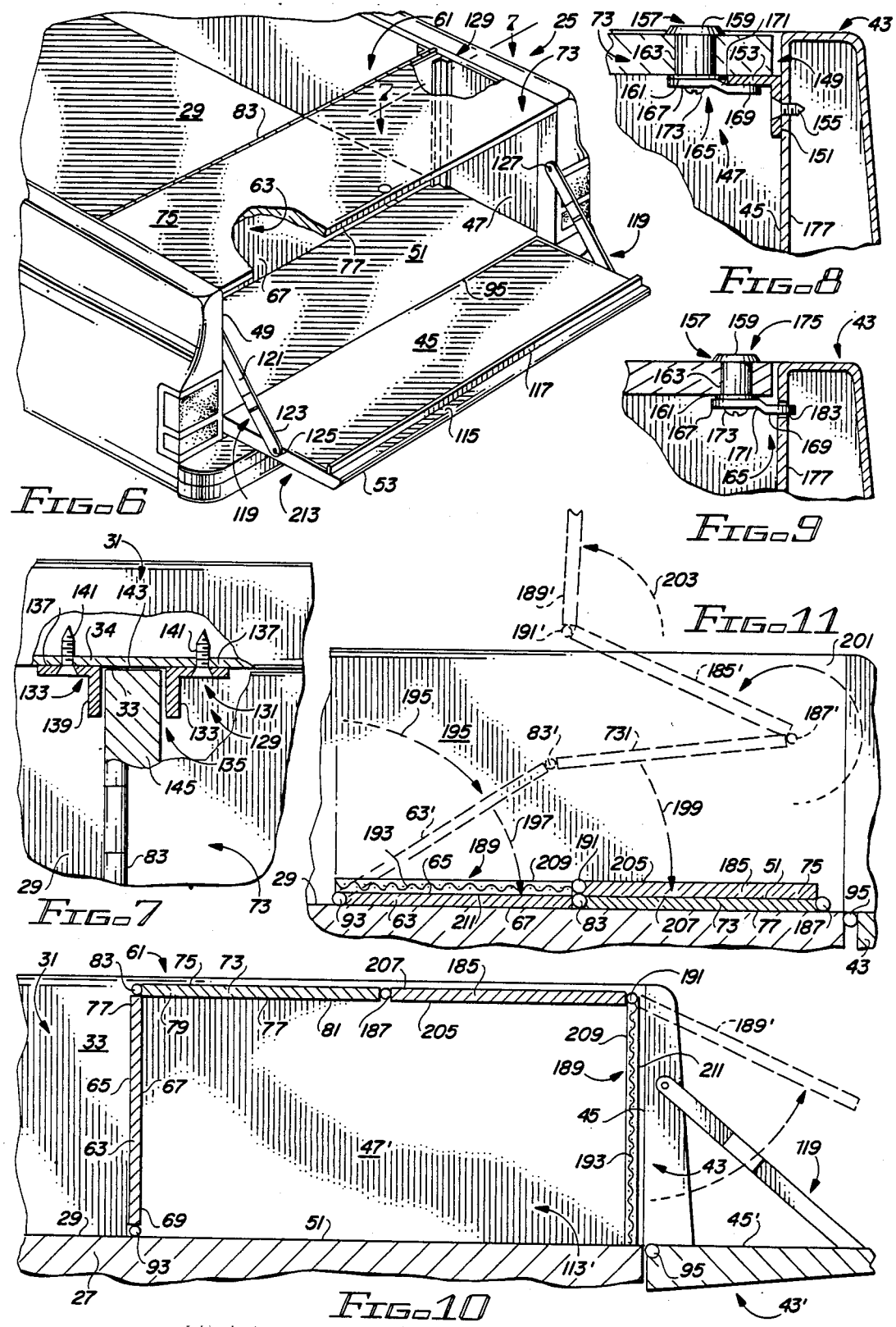

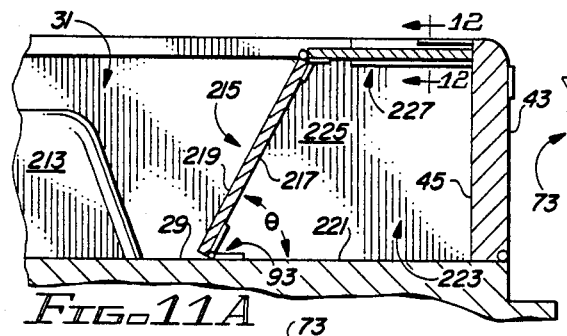
FIG.__11A
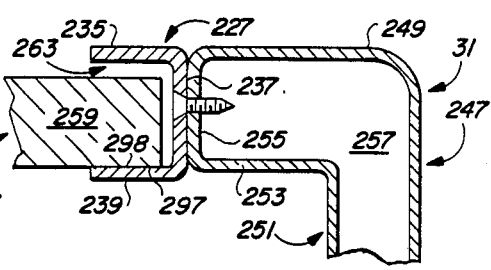
FIG.__12
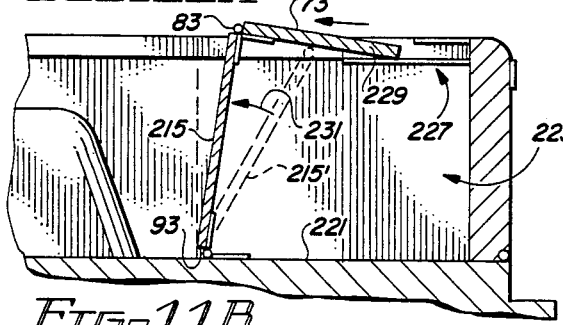
FIG.__11B
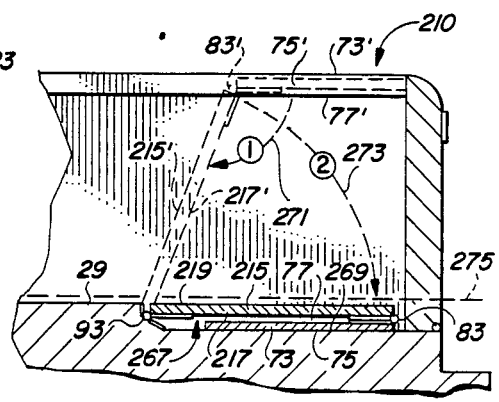
FIG.__13
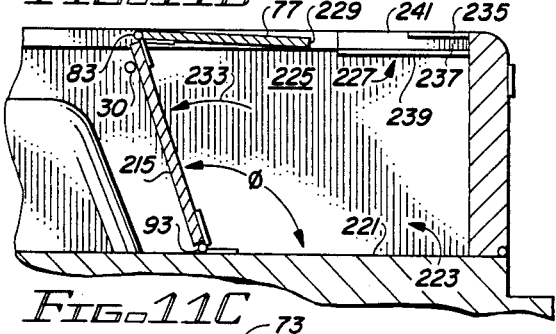
FIG.__11C
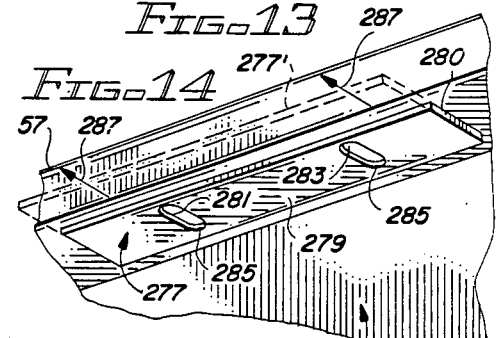
FIG.__14
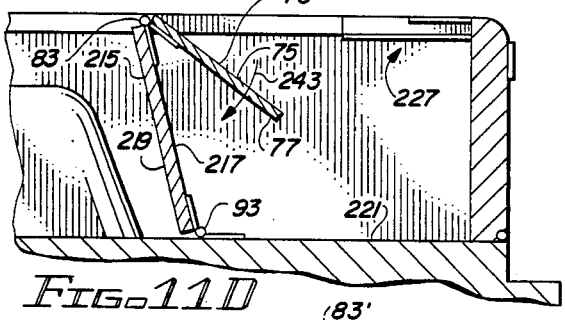
FIG.__11D
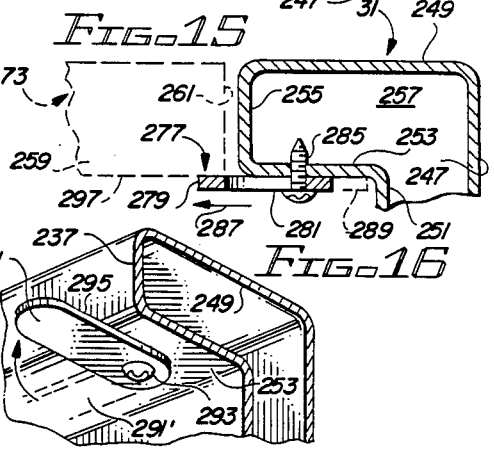
FIG.__15
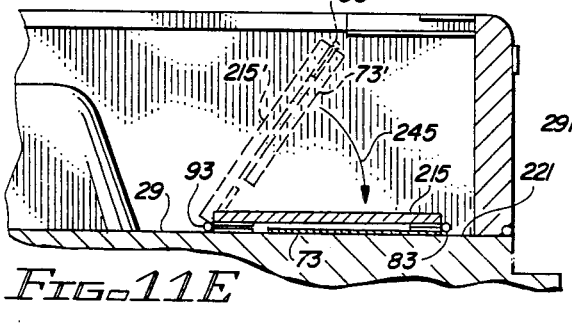
FIG.__11E
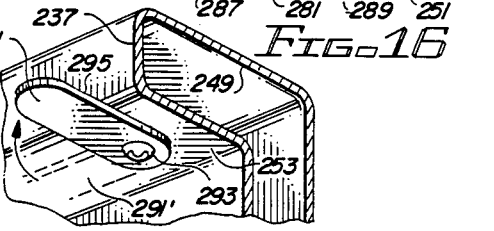
FIG.__16

BOX-LIKE UTILITY STORAGE APPARATUS FOR PICK-UP TRUCKS

BACKGROUND OF THE INVENTION

1. Field of the Invention

The present invention relates generally to a six-sided, box-like enclosure unit for a pick-up truck, and more particularly to an enclosure unit in which four of the sides are formed from portions of the pick-up truck bed itself and only two of the sides need to be added.

2. Description of the Prior Art

The prior art is replete with box-like containers, enclosures, storage units, and tool chests adapted to be carried in pick-up trucks. some of the prior art storage units are adapted to be positioned behind the seat in the cab of the pick-up truck. Still others are adapted to be permanently or removably carried in the bed of the truck. Most such tool boxes adapted to be carried in the bed of the truck are adapted to be carried on the top of the sides and suspended into the bed of the truck so they can be lifted out or removed. Normally, these are fixedly secured in place in the front end of the truck to prevent the box from sliding back and forth.

Even if such a tool box is provided in the rear of the truck, the box initially requires a complete six sides and uses no portion of the pick-up truck bed itself as one or more of the sides.

The tool boxes of the prior art are relatively expensive, bulky, combersome, difficult-to-install, difficult-to-remove, difficult-to-access for adding or removing articles from storage too large thereby reducing the usable area of the bed.

Therefore, there has existed a long-felt need for a relatively easy-to-use, easy-to-access, low-cost enclosure for a pick-up truck wherein an enclosure can be quickly and easily removed or simply folded down in an out-of-the-way storage position to provide full access to the bed of the truck for carrying purposes and the like.

BRIEF SUMMARY OF THE INVENTION

It is an object of the present invention to provide an easy-to-install, easy-to-remove, easy-to-store, easy-to-use, low cost, aesthetic box-like container for the bed of a pick-up truck.

It is another object of the present invention to provide a six-sided, box-like enclosure for installation in the bed of a pick-up truck wherein four of the six sides of the enclosure are formed by portions of the truck bed itself.

It is a further object of the present invention to provide a pick-up truck utility storage unit which is easy-to-access and easy-to-close utilizing the tailgate of the pick-up truck.

It is still another object of the present invention to provide a box-like enclosure for the rear of a pick-up truck in which at least two of the panels forming the box are adapted to be folded-up for storage purposes.

It is yet a further object of the present invention to provide a recess or depression in the rear of the floor of a pick-up truck and to hingedly couple two or more panels together so that they can be folded one over the other, and then folded down into the recess for storage purposes.

It is yet another object of the present invention to provide a six-sided, box-like enclosure for the rear of a pick-up truck which includes at least three hingedly-connected panels or in which the third panel is substantially parallel to the raised tailgate and includes a mesh-like material for admitting light and air into the container so that it can be used for carrying animals and the like.

The present invention involves a six-sided, box-like storage unit for the rear of a pick-up truck. In one embodiment, four of the six sides of the unit or enclosure are formed by portions of the pick-up truck itself. The opposite ends of the enclosure are formed by portions of the sides of the truck, while the bottom is formed by the floor of the truck and the rear of the interior surface is formed by the interior surface of the truck tailgate. The other two sides are formed by a pair of panels hingedly connected so they can be folded one-upon-the-other for storage purposes.

In one embodiment, a pair of vertical, channel-forming members are attached to the inside surfaces of opposite sides of the bed of the truck and are adapted to slidably receive a first panel therein. The first panel strands substantially vertical so that its plane is generally parallel to the plane of the interior surface of the tailgate and perpendicular to the plane of the floor. Hingedly connected to the first or upright panel is a second or top panel hingedly connected to the first panel so that it can be folded thereover and then removed from the channel for storage purposes as desired. Simply by moving the two panels out of the channel, the entire bed of the truck can be used for hauling purposes. the panel can be reinserted into the channel and the top portion folded down to complete the enclosure when it is needed. Means are provided for latching the top panel to the tailgate, and horizontal support means are provided for supporting the top panel in a horizontal position.

In another embodiment of the present invention, one or more additional horizontal panels can be added, and all of the panels folded over one another for storage purposes. In another embodiment, the channel-forming means are eliminated and the first vertical panel is hingedly connected to the floor of the truck. The panels can be folded on top of one another and the entire assembly of folded panels can then be folded about the floor hings so as to lay substantially flat onthe floor in a storage position so as not to significantly interfere or greatly reduce the payload capabilities of the bed of the truck.

Furthermore, another embodiment of the present invention contemplation an upright panel hingedly connected to the floor and having a width greater than the width of the top panel. The top panel is adapted to slide in and out of a C-channel by pushing the top panel member forward, folding the panels one over the other, and then closing the folded panels about the floor hinge to position them upon the floor for storage purposes. In yet another embodiment, a recess or depression is provided in the floor of the truck adjacent the tailgate, and the entire assembly is folded down into the recess so that the top or uppermost panel stored in the recess has a plane which is generally coplanar with the floor of the truck so the entire bed is available as desired.

Various latching means and horizontal support means are provided. Furthermore, at least one other panel can be hingedly connected to the top panel and lowered in a generally vertical position adjacent the tailgate. The tailgate can then be lowered to a horizontal position so that air and light are admitted to the enclosure through a mesh-like material forming the additional vertical panel. In this embodiment, the enclosure can be used to carry pets, animals, and the like safely in the bed of the truck.

These and other objects and advantages of the present invention will be more fully understood after reading the detailed description of the preferred embodiments, the claims, and the drawings which are briefly described hereinbelow.

BRIEF DESCRIPTION OF THE DRAWINGS

FIG. 6 is a partial perspective view of the bed of a pick-up truck provided with another embodiment of the enclosure assembly of the present invention;

FIG. 7 is a sectional top view of the channel-forming means of the enclosure of FIG. 6 taken along view lines 7—7 thereof;

FIG. 8 is a sectional end view illustrating one embodiment of a latching means usable with the enclosure apparatus of FIG. 6;

FIG. 9 is a partial sectional side view of yet another modification of a latching means usable with the present invention;

FIG. 10 is a sectional side view illustrating yet another embodiment of the enclosure apparatus of the present invention;

FIG. 11 illustrates the folding of the panels of FIG. 10 and their disposition in a storage position;

FIG. 11A is a partial sectional side view of still another embodiment of the enclosure apparatus of the present invention;

FIG. 11B illustrates the hinged panels being moved forward partially out of the C-channel means of FIG. 11A;

FIG. 11C shows the hinged panels totally removed from the C-channel for access to the storage area or for folding purposes;

FIG. 11D shows the panels of FIG. 11C in a partially-folded position;

FIG. 11E shows the panels of FIG. 11D in a folded and stored position;

FIG. 12 is a sectional end view of the C-channel-forming assembly of FIG. 11A taken along view lines 12—12 thereof;

FIG. 13 illustrates yet another embodiment of the present invention wherein the folded panels are stored in a recess in the bed floor;

FIG. 14 is a partial side view illustrating a positionable rail for supporting the top panels in a horizontal position;

FIG. 15 is a partial sectional end view of the slidable rail assembly of FIG. 14; and FIG. 16 is a partial perspective illustration of yet another horizontal support means usable with the embodiments of the present invention.

DETAILED DESCRIPTION OF THE PREFERRED EMBODIMENTS

Figure 1:
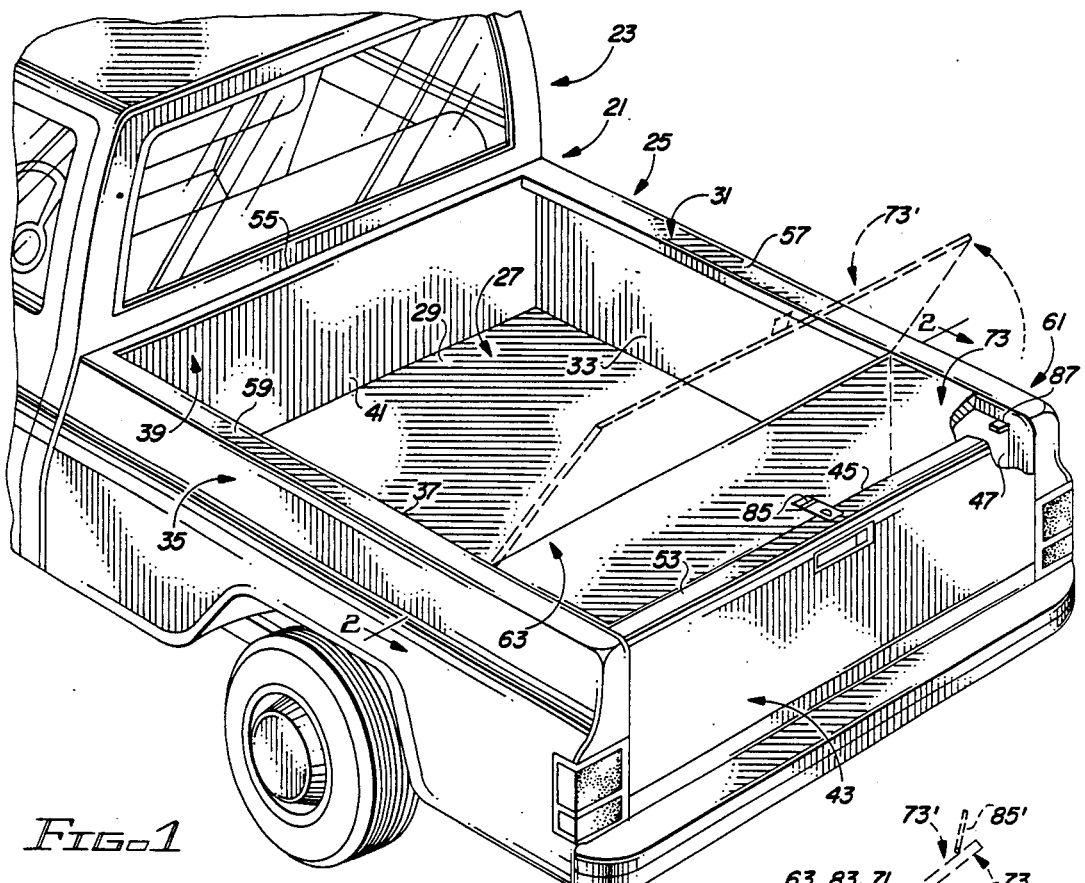
FIG. 1 is a perspective view of a pick-up truck having a bed provided with the box-like enclosure of the present invention.

FIG. 1 shows a pick-up truck 21 having a pick-up truck cab 23 and a pick-up truck rear or bed 25. The bed 25 includes a bed floor 27 having a top bed floor surface 29. The bed 25 also includes a right side 31 having a right interior surface 33 and a left side 35 having a left interior surface 37. The bed 25 further includes a front panel 39 having a rear surface 41 and a tailgate 43 having an interior tailgate surface 45.

Furthermore, the right side 31 includes an interior right side surface portion 47 to the rear of the truck near the tailgate 43 and a corresponding left interior side surface portion 49. Similarly, the floor has a rear floor surface portion 51. The right and left side portions 47 and 48 together with the rear floor surface portion 51 are used as three of the six sides of the invention as later described herein with respect to FIG. 6.

The tailgate 43 includes an upper or top surface 53 while the right side 31 includes an upper surface 57 and the left side 35 includes an upper surface 59. Lastly, the front panel portion 39 includes an upper surface 55. The bed 25 of the pick-up truck 21 is conventional in that the interior surfaces 33, 37 and 41 of the right side 31, left side 35, and front panel 55, respectively, form three of the four sides of the bed 25 surrounding the floor surface 29 which forms the fifth side. The fourth side is formed by the interior front surface 45 of the tailgate 43 to form a substantially box-like bed enclosure having an open top as the sixth side. Generally, the plane established by the upper surfaces 53, 55, 57, and 59, is generally parallel to the plane of the floor 29 and perpendicular to the plane of the sides 31 and 35, the front panel 39, and the tailgate 43.

The present invention includes a six-sided, box-like storage assembly, container, enclosure or unit 61 mounted in the rear of the pick-up truck bed 25, as shown in FIG. 1. The box-like storage assembly 61 has four of its six sides formed by portions of the pick-up truck bed 25 itself. The bottom of the enclosure 61 is formed by the floor surface portion 51; the right end of the enclosure 61 is formed by the right side surface portion 47; the left end is formed by the left side surface portion 49; and the rear longitudinal side is formed by the interior surface 45 of the tailgate 43. The fifth and sixth sides are formed by a first or generally upright panel 63 and a second, top or horizontal panel 73. Only these two panels need to be added to complete the six-sided, box-like construction of the enclosure 61 of the preferred embodiment of the present invention.

The first, front, or upright panel 63 is a generally elongated, rectangular panel having a length and a width. The length of the panel is substantially equal to the perpendicular distance between the interior surfaces 33 and 37 of the right and left sides 31, and 35, respectively. This distance is measured along the lateral aixs of the bed 25 of the pick-up truck 21. The bed 25 also has a longitudinal axis extending from front to rear of the bed. The width of the front panel 63 is equal to the vertical height between the floor surface 29 and the plane of the surfaces 53, 55, 57 and 59.

Figure 2:
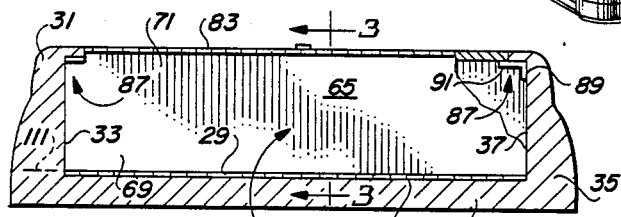
FIG. 2 is a sectional view of the enclosure apparatus of FIG. 1 taken along view lines 2—2 threreof.
Figure 3:
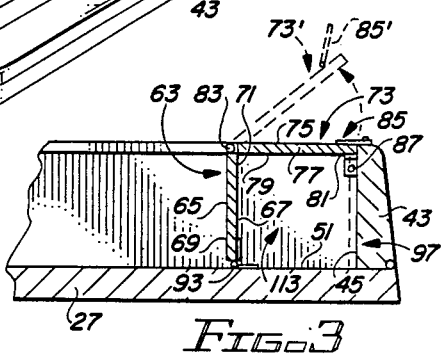
FIG. 3 is a sectional side view of a portion of the enclosure of FIG. 1 taken along view lines 3—3 of FIG. 2.

As shown in FIGS. 2 and 3, the upright panel 63 includes a front external surface 65 and a rear or internal surface 67. The first or front panel 63 also includes a bottom longitudinal edge portion 69 and a top longitudinal edge portion 71. Similarly, the second or top rectangular panel 73 also has a length and a width. The length of the top panel 73 is substantially equal to the length of the first panel 63 while the width may be equal to the width of the first panel 63 or slightly shorter, depending upon the embodiment described.

Furthermore, as shown in FIG. 3, the second panel 73 includes a top or exterior surface 75, a bottom or interior surface 77, a first or front edge portion 79 and a second or rear edge portion 81. A panel hinge assembly 83 is operably disposed between the top edge portion 71 of the first upright panel 63 and the front edge portion 79 of the second panel 73. This hinge 83 can enable the second panel 73 to rotate or turn in a hinge-like manner with respect to the first panel 63 so that the panels can be folded one-upon-the- other for storage purposes, as hereinafter described. The box-like enclosure 61 of FIG. 1 also illustrates a latch assembly 85 and a horizontal support assembly 87.

FIG. 2 is a sectional and view laterally across the bed 25 of the pick-up truck 21 looking rearwardly through the enclosure 61. FIG. 2 shows the bed 27 having a generally planar floor surface 29; the right side 31 having a generally planar vertical surface 33; and the left side 35 having a generally planar vertical surface 37. The first or upright panel 63 includes a front or exterior surface 65 and the top longitudinal edge portion 71 of the upright panel member 63 is attached via a panel hinge assembly 83 to the front edge portion 79 of the top panel 73. Opposite ends of the top or horizontal panel 73 are shown as being disposed on the horizontal support assemblies 87 which include a generally L-shaped member having a first leg 89 and a second leg 91, with the first leg 89 being generally perpendicular to the second leg 91. The first leg 89 is shown as being attached or secured to the interior surface 37 of the left side 35 so as to expose and extend a second leg 91 beyond the plane of the left side 25 in a horizontal direction and into the interior of the bed 25 so that its top surface can support a first or left lateral end portion of the top panel 73. Similarly, a corresponding horizontal support assembly 87 on the right side of the bed 25 supports the right lateral edge portion of the top panel 73 in a horizontal position. FIG. 2 also shows the bottom longitudinal edge portion 69 of the first upright panel 63 being hingedly attached to the surface 29 of the floor 27 via floor hinge assembly 93.

FIG. 3 shows a sectional side view of the pick-up truck bed 25 including the box-like storage apparatus 61 of the present invention. FIG. 3 shows the first panel 63 as being operably disposed in an upright vertical position and having an exterior or front surface 65 and an interior or rear surface 67 which faces onto the hollow interior 113 of the enclosure 61. Similarly, the second panel 73 is shown as including an upper or exterior surface 75 and a lower or interior surface 77 facing the hollow interior 113 of the enclosure 61. These two sides form two of the six sides and two of the four longitudinal sides of the enclosure apparatus 61 of the present invention. The other two longitudinal sides are formed by the floor surface portion 51 and the interior surface 45 of the tailgate 43 while the other two sides of the six-sided, box-like FIG. 61 of the present invention are formed by the opposite interior side surface portions 47 and 49 of the sides 31 and 35, respectively. These six sides, including four sides defined by truck surfaces and two sides formed by the panels 63 and 73, form the enclosure apparatus 61 of the present invention.

FIG. 3 also shows a panel hinge 83 hingeably interconnecting the front edge portion 49 of the top panel 73 with the top edge portion 71 of the first panel 63. A floor hinge 93 is shown as hingeably connecting the bottom longitudinal edge portion 69 of the first panel 63 with the surface 29 of the floor 27 of the pick-up bed 25. The opposite edge portion 81 of the top panel 73 is shown as being operably disposed on horizontal support member 87 while a latching means 85 secures the top 53 of the tailgate 43 to the top horizontal surface 75 of the second panel 73 for latching or locking purposes. The reference numeral 73' illustrates the top panel 73 in a raised position for access to the hollow interior 113 of the enclosure 61 of the present invention. The vertical panel 97, shown in phantom lines, represents a second vertical panel disposed in parallel to the surface 45 of the raised tailgate 43 and it includes a mesh-like open-weave material for admitting air and light into the hollow interior 113 of enclosure 61 when the tailgate is down in a horizontal position for enabling animals, pets, or the like to be carried in the enclosure 611.

Figure 4:
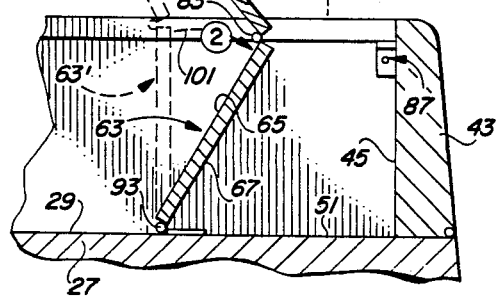
FIG. 4 is a partial sectional side view showing one method of folding the panels of the enclosure upon one another for storage purposes.
Figure 5:
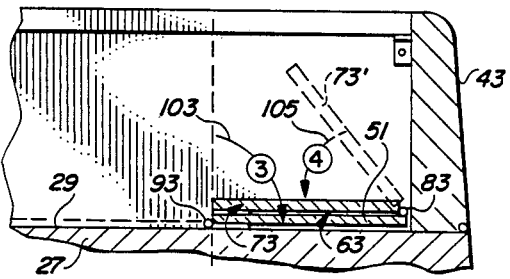
FIG. 5 illustrates the folded panels of FIG. 4 in a stored position.

FIG. 4 illustrates the first panel 63 having its lower edge portion hingeably attached to the floor surface 29 via floor hinge 93 and its opposite edge portion connected via panel hinge 83 to the front edge portion of the second panel 73. FIG. 4 illustrates one direction of folding the panels 63 and 73 upon one another for storage purposes. The path designated by reference numeral 99 shows that the top panel 73' is initially lifted up then folded down on the first panel 63 such that the top exterior surface 75 of the upper panel 73 is disposed on and adjacent to the front exterior surface 65 of the first panel 63, and then the folded combination, as shown in FIG. 5, is folded in accordance with the fold paths 103 and 105 such that the final storage position shows the upper panel 73 folded upon the lower panel 63 such that the interior surface 67 of the lower panel 63 is substantially flush against the floor surface portion 51 while the opposite or front exterior surface 65 is immediately adjacent and flush against the top exterior surface 75 of the second panel 73 leaving the interior surface 77 of the second panel 73 disposed slightly above the plane of the bed floor surface 29, but nonetheless in an out-of-the-way storage location so that entire bed 25 of the pick-up truck 21 can be used for its normal purposes without interference from the stored enclosure apparatus 61.

FIG. 6 illustrates an embodiment of the enclosure apparatus 61 of the present invention which is removable from the pick-up truck 21 entirely, if desired. In FIG. 6, the first panel 63 has no hinge connecting it to the floor surface 29. A panel hinge 83 connects the top longitudinal edge portion of the first panel 63 to the front longitudinal edge portion of the second panel 73. The opposite lateral edge portions of the first panel 73 are adapted to be slidably received within channels formed on opposite sides of the bed 25 by vertical channel-forming means or assemblies 129, as hereinafter described. FIG. 6 also shows a tailgate adjustment member 119 having a first portion 121 and a second portion 123. The portion 121 has its upper end pivotally attached to the interior surface 37 of the left side 35 of the truck 21 by a pivot means 127 while the upper end of the right side 31 is connected via a similar pivot means 127 to the interior surface of the right side of the pick-up truck 21. The opposite lower end portion of the member 123 is connected via pivot pin 125 to the side portion of the tailgate 43 and the portion 121 is adapted to be telescopically received into the portion 123 such that the tailgate 43 can be raised to a vertical position for closing the enclosure 61. Likewise, the member 121 can be withdrawn or extended from within the member 123 for positioning the tailgate 43 in the horizontal position, as shown in FIG. 6. The interior surface 45 of the tailgate 43 is also shown as including a top planar edge portion 115 and a ledge portion 117 extending the length of the tailgate 43 and extending perpendicular to the surfaces 45 and 115. This ledge 117 serves as a horizontal support member for supporting the rear longitudinal edge of the horizontal panel 73.

FIG. 7 illustrates the channel-forming assembly 129 of FIG. 6. In FIG. 7 the channel-forming apparatus 129 is shown as including a first L-shaped member 131 and a second L-shaped member 133. The member 131 includes a first leg portion 137 and a second leg portion 139. The leg 137 is shown as being secured to the interior surface panel 34 of the right side 31 of the bed 25. The first leg portion 137 extends parallel to the side surface 33 while the second leg portion 139 extends generally perpendicular thereto toward the interior of the truck bed. The second L-shaped member 133 includes a similar first leg 137 secured to the side surface panel 34 via the fastener member or screw 141 while the opposite or second leg 139 extends generally perpendicular to the plane of the side surface 33. The space or channel 135 formed between the two outwardly extending members 139 is adapted to receive a lateral side edge portion 145 of the first rectangular panel 63 such that the distal end 143 of the panel 63 nearly abuts the side surface 33. The channel 135 is adapted to slidably receive the end portion 145 of the first upright or vertical panel 63 therein, and since a similar channel-forming assembly 129 is disposed on the opposite side of the truck 21, the opposite end of the first panel 63 will be received therein so that the channel-forming assemblies 129 position and hold the first panel 63 in an upright vertical position forming one of the six sides of the box-like enclosure 61 of the present invention.

FIG. 8 shows one embodiment of a latching means 147 which includes an L-shaped member 147 and lock cylinder assembly 157. The L-shaped member 147 includes a first leg 151 adapted to be secured to vertical panel 177 of the tailgate 43 via the threaded fastener member 155 while the opposite perpendicular leg 153 extends into the interior of the bed and is aligned with the longitudinal axis thereof. The upper surface of the inwardly extending leg 153 is adapted to carry the longitudinal rear edge of the top panel 73 for serving as a horizontal support therefor.

The latching assembly 147 also includes lock cylinder assembly 157 having a generally circular upper key input section 159, a cylindrical barrel portion 163, and a lower portion 161. Lastly, the latch assembly 147 includes member 165 having a first portion 167 secured to the interlock portion 161 by a fastener means 173. The first portion 167 is connected via an intermediate sloped portion 171 to a second end portion 169. The end portion 169 is adapted to be turned by the insertion of a key in the key insert portion 159 for turning the end portion 169 about the axis of the screw fastener 173 so as to position the end portion 169 beneath the interior surface of the second leg 153 of the L-shaped member 149 for locking purpose. Similarly, the cylinder 163 can be rotated by the insertion and turning of a key in the end portion 159 to turn the end portion 169 at a 90° angle from the position it is shown so as to remove it from under the second leg member 153 thereby enabling the top panel 73 to be lifted about the hinge 83 for access to the interior 113 of the enclosure 61.

FIG. 9 shows another embodiment of the latch assembly 175 wherein the interior surface panel 177 of the tailgate 43 is provided with an aperture 183, and the end portion 169 of the member 165 extends into and out of the aperture 183 as the key is inserted in the cylindrical end portion 159 for rotating the barrel 163 in one direction or the other.

FIG. 10 shows another embodiment of the box-like enclosure 61 of the present invention. In FIG. 10, the first panel 63 is shown as having its lower longitudinal edge portion 69 connected to the surface 29 of the floor 27 via a floor hinge 93. The upper end portion 71 of the first panel 63 is connected to the front end 79 of the second or horizontal panel 73 via panel hinge 83. In FIG. 10, the first panel 63 and the second panel 73 are assembled in the use position, and the plane of the upright or vertical panel 63 is generally perpendicular to the surface or plane 29 of the floor 27 and to the plane of the second panel member 73.

The opposite longitudinal edge portion 81 of the second panel 73 is connected to the front longitudinal edge portion of a third panel 185 by a second panel hinge 187 while the opposite longitudinal edge portion of panel 185 is connected via a third panel hinge 191 to the upper end portion of a fourth panel 189 whose opposite end portion is adapted to be disposed proximate the floor surface portion 51 of the hollow interior 113' of the box-like apparatus 61 of FIG. 10.

It will be seen that the first panel 63 has a front or exterior surface 65 and a rear or interior surface 67 while the second panel 73 has an upper exterior surface 75 and a lower interior surface 77. Similarly, the third panel 185 has an upper exterior surface 207 and a lower interior surface 205. Lastly, the fourth panel 189 includes an outer or exterior rear surface 211 and an inner or interior front surface 209. The hollow interior 113' of the container or enclosure apparatus 61 of the present invention is defined as lying within and between the inner surfaces 67 of the first panel 63, 77 of the second panel 73, 205 of the third panel 185, and 209 of the fourth panel 189. The fourth longitudinal boundary is the floor surface 51 adjacent the tailgate 43, and the opposite ends are formed by right side surface portion 47' and the left side surface portion 49'. It will be observed that any reasonable number of horizontal panels can be used in the embodiment of the present invention, with each of the panels extending the depth of the enclosure assembly 61.

Furthermore, it can be seen that the last panel 189 can be adapted to be disposed in a vertical position and can be made from a generally mesh-like material 193 for admitting light and air to the hollow interior 113' of the enclosure 61. In this embodiment, the tailgate 43 would normally be placed in the horizontal or open position as indicated by 43' so that pets or animals could be safely carried within the hollow interior 113' of the enclosure assembly 61 while keeping the animals perfectly safe while preventing their escape or accidental injury caused by jumping or falling out of the bed of the truck, or the like.

FIG. 11 illustrates the four panels 63, 73, 185, and 189 of FIG. 10 in the folded storage position whereby the interior surface 67 of the first panel 63 and the interior surface 77 of the second panel 73 are disposed flush against the floor surface portion 51 while the exterior surface 207 of the panel 185 and the exterior surface 211 of the panel 189 are folded back over and disposed against the exterior surface 65 of the first panel 63 and the exterior surface 75 of the second panel 73. In this manner, the panels lie flush against the floor and flush against one another in the folded position so that the raised surface portion including the surface 205 of panel 185 and the surface 209 of panel 189 form a plane which is only slightly raised above the floor hinge 93 and above the plane of the floor surface 29 of the pick-up truck bed 25.

Panels 63′, 73′, 185′, and 191′, which are shown in phantom lines, are used to illustrate the initial fold directions to arrive at the folded storage configuration previously described. The first fold direction is illustrated by reference numeral 195 and the second fold arrow by reference numeral 197. The third fold is indicated by fold direction arrow 199 and the fold arrow 201 represents the fold about the panel hinge 187′ between the second and third panels 73′ and 183′, respectively. The last fold direction arrow 203 shows the fourth panel 189′ being folded down in line with the third panel 185 to arrive at the final folded storage configuration of FIG. 11.

FIG. 11A represents still another embodiment of the six-sided box-like enclosure apparatus 210 of the present invention. The enclosure 210 is shown as including the previously described four portions of the truck itself, with the remaining two sides being formed from a first generally upright panel member 215 whch has a front or exterior surface 219 and a rear or interior surface 217. The lower end portion of the first panel 215 is connected to the floor surface 29 via floor hinge 93. The upper end portion of the first panel 215 is connected to the front end portion of a second or horizontal panel 73. A substantial part of the opposite end portion of the upper panel 73 is disposed within a C-channel assembly 227. The upper panel 73 includes the interior surface 77 forming one boundary of the enclosed space 223 of the box-like enclosure 210 while the interior surface 217 of the first panel 215 forms yet another side of the bounded space 223. The floor surface portion 221 forms yet another side while the interior surface 45 of the tailgate 43 forms the fourth and final elongated, longitudinal side of the enclosure assembly 210. The end portion 225 and a corresponding opposite end portion of the sides 31 and 35, respectively, form the two ends and the final fifth and sixth sides of the box-like enclosure 210 as previously described.

The FIG. 11A shows a portion of the floor surface 29 and the portion of the side 31 as including a wheel well portion 213. Furthermore, FIG. 11A illustrates an embodiment in which the length of the generally rectangular, longitudinal panel 215 and 73 are substantially equal while the width of the first panel 215 is greater than the width of the upper panel 73. The upright panel 215 forms an acute angle "θ" between the plane of the panel 215 and the floor surface 221 toward the rear of the floor hinge 93 and the tailgate 43.

FIG. 11B illustrates the embodiment of FIG. 11A wherein the upper panel 73 has been pushed forward toward the cab 23 such that the rear end portion 229 is slid out of the C-channel 227 while resting upon the rail continuation portion thereof as hereinafter described in FIG. 11C. As the top panel 73 is moved forward, the first panel 215 is also rotatably moved forward toward a vertical position as illustrated by direction arrow 231.

In FIG. 11C, the upper panel 73 has moved forward as the first panel 215 is rotated about floor hinge 93, as shown by arrow 233, and panel member 73 has the end portion 229 completely out of the C-channel assembly 227, and the plane of the first panel 215 forms an obtuse angle "θ" with the floor plane 221 toward the rear of the floor hinge 93 and the tailgate 43. At this general point, the top edge portion of the panel 215 reaches a stop member 30 operably disposed on opposite sides of the truck bed for preventing a panel 215 from falling forward about the floor hinge 93. In the position of FIG. 11C, access can be had to the hollow interior portion 223 of the enclosure 210 through the now-opened top section, as indicated by arrow 224, even though the tailgate 43 is in the raised or closed use position. Furthermore, the upper panel 73 is now in a position whereby it can be folded about the panel hinge 83 onto the first panel 215 for storage purposes, as hereinafter described.

The C-channel assembly 227 is shown as including a generally rectangular face plate 237 which is disposed substantially parallel to the top inside surface 225 of side right 31 of the truck bed 25. The lower, generally rectangular rail member 239 is integral with the lower edge portion of the rectangular member 237 and is substantially perpendicular thereto, while the upper rail member or channel-defining member 235 has a length less than the length of the lower rail member 239 and is itself perpendicular to the member 237 and parallel to the member 239 so as to form a hollow, C-channel between the extending rail portions 235 and 239. The open portion 241 where the continuation of the upper rail 235 is missing and the lower rail 239 continues, enables the rear end portion 229 of the upper panel 73 to be lifted upward therefrom about the panel hinge 83 for access to the hollow interior 223 of the enclosure 210, as desired.

FIG. 11D illustrates the folding of the second panel member 73 upon the first panel member 215. In FIG. 11D, the panel 73 is folded, as indicated by the directional fold arrow 243, until the surface 77 of panel 73 is flush against the interior surface 217 of the first panel member 215.

Then, as indicated in FIG. 11E, the folded combination of the surface 77 of the second member 73 upon the surface 217 of the first panel member 215 is turned or folded about the floor hinge 93, as shown by fold arrow 245, such that the front exterior surface 219 of the first or wider panel 215 forms the uppermost surface of the stored configuration and the upper exterior surface 75 of the top panel 73 is disposed flush against the floor surface 221. This is a storage position and the shorter length of the upper panel 73 with respect to the lower panel or first panel 215 is used so that the floor hinge 93 does not raise the front end portion of the folded combination within the storage position of FIG. 11E. In FIG. 11E, the storage position shows that the plate of the folded combination is disposed only slightly above the plane of the floor surface 29 so that the folded assembly is out of the way and enables substantially all of the truck bed to be used for its intended purpose while enabling the enclosure 210 to be quickly reassembled when its use is required.

FIG. 12 is an end view of the C-channel assembly 227 of FIG. 11A. In FIG. 12, the side 31 of the truck bed 25 is shown as including an outer side wall 247 and an outer top wall 249 joined to an inner side wall 251 and an inner wall 253 by a joining member 255 such that a hollow interior portion 257 is formed therebetween. The generally rectangular base member 237 is shown as being fixedly secured to the outer surface of the member 255 by a threaded fastener 265 so as to rigidly position the upper rail 235 and lower rail 239 substantially parallel to the floor 221 and perpendicular to the plane 45 of the raised tailgate 43. A space between the extending members 235 and 239 is defined as a channel space 263, and the lateral or side end portion 259 of the panel 73 is disposed within the hollow interior 263 of the channel 227 such that the lower surface 297 of the edge portion 259 is operatively disposed and supported on the upper interior surface 298 of the bottom rail 239 as shown in FIG. 12.

FIG. 13 shows yet another embodiment of the enclosure apparatus 210 of the present invention wherein the floor surface 29 of the pick-up truck bed 25 is provided with a depression or recess 267. The floor hinge 93 is partially mounted within the recess 267 and when the top or upper panel 73' is folded as indicated by fold arrow 271 such that the interior surface 77 is disposed flush against the interior surface 217 of a first panel 215, and then the folded assembly is rotatably lowered, as indicated by the second fold path arrow 273, such that the entire folded combination is disposed within the recess 267. It will be observed that the interior surface 75 of the top panel 73 is disposed flush against the floor portion 269 of the recess 267 while the opposite exterior surface 75 of the top panel 73 is adjacent the interior surface 217 of the upright panel 215. Both panels are pivoted about the floor hinge 93 such that the opposite front surface 219 of the upright member 215 is substantially coplanar with the floor 29 of the pick-up truck bed 25 such that the plane 275 at floor level or the pick-up truck bed 25 enables all the space within the pick-up truck bed 25 to be used for its intended purposes without the folded and stored combination of the first panel 215 and the top panel 73 being in the way. The unit 210 can be quickly reassembled simply by pivoting the folded combination upward about the floor hinge 93 until the first member 215 achieves the obtuse angle position and then the second panel 73 can be raised about the panel hinge 83 to the horizontal position as indicated by panel 73'. The rear edge portion 259 of the panel 73 can be placed on rail member 239 and the assembly rotated rearwardly about floor hinge 93 to slide the end portion 239 into the channel 263 of the C-channel assembly 227 until the distal end 261 substantially abuts member 255 as the panel 215 forms acute angle and the panel 73 is horizontal for closing the top of the enclosure 210.

FIG. 14 illustrates an alternate embodiment to the C-channel of FIG. 11A wherein the horizontal support assembly 247 includes a first, generally rectangular member 277 having a body portion 279 and a pair of spaced apart apertures or slots 281 and 283 disposed therein. Threaded members 285 passed through the slots 281 and 283 to secure the member 277 loosely to the sidewall 251 such that the member 277 can be positioned inwardly as shown in FIG. 14. Similarly, the member 277' can be moved toward the bed interior in the direction of motion arrows 287 until the screw fasteners 285 are at the rear or opposite end of the slots 281 and 283 to position the member 277' to a use position wherein the top or upper lip surface 280 can serve as a rail to support the lower edge portion 297 of the outer peripheral edge 259 of the top panel member 73, as previously described.

FIG. 15 shows yet another embodiment of the horizontal support member 277 of FIG. 14. In FIG. 15, the threaded fastener 285 is used to loosely secure the body 279 of the rectangular member 277 to the side wall panel 253 by insertion through the slot 281. In this manner, the member 277 can be extended to position it interiorly, (as indicated by motion arrow 287) as shown in FIG. 15, so that the upper surface 280 of the body portion 279 of member 277 is adapted to horizontally support the lower surface 297 of the edge portion 259 of the top panel 73, as previously described. Furthermore, the member 277 can be slid toward the side wall 251 so that the slot 281 is positioned with its front and adjacent the fastener 285 at its rear end in the position shown in phantom lines and represented by reference numeral 289 so that the forward end of the body portion 279 is retracted and positioned out-of-the-way during non-use.

FIG. 16 illustrates yet another embodiment of a horizontal support member 291 which is pivotably secured at one end by a fastener 293 secured to the side panel 253 such that the member 291 can be turned at 90° to its position in FIG. 16 as indicated by the phantom lines of position 291' for out-of-the-way storage purposes or turned 90° so that its axis is generally perpendicular to the surface of the side panel 237 so that the top or upper surface 295 of the member 291 is adapted to receive the lower surface 297 of the end edge portion 259 of the panel 73 thereon to support it in a horizontal position, as previously described.

It will be understood by those having ordinary skill in the art that various modifications, variations, substitutions, changes, and alterations can be made in the structure and material of the present invention, without departing from the spirit and scope thereof, which is limited only by the appended claims.

What is claimed is:

1. In combination with a pick-up truck having a truck bed and a tailgate at one end thereof, a storage cover for a portion of a bed of said truck comprising:

a first rigid panel member positioned horizontally from side to side across the rear end portion of said bed adjacent to the tailgate of the truck and supported on the side walls of said bed, a second rigid panel member secured to a first edge of said first panel member to a hinge connection and having a contour fitting the side walls of said bed when installed therein at an angle downwardly and forward from said first edge of said first panel member, means for hingedly attaching said second panel member to said bed, said first panel member being supported on the side walls of said bed by channel means, one mounted on each of said side walls and extending longitudinally of said bed, said channel means being adapted for receiving opposite end edge portions of said first panel member therein for supporting same and enabling said first panel member to slide forwardly in a substantially horizontal position on the side walls of the said bed within said channel means a predetermined distance to one end thereof for partially opening the enclosures formed by said cover and said bed before sliding of said first panel member out of said channel means to enable same to be pivoted about said second panel member, and each of said channel means at said one end having like top portions removed for enabling said first edge of said first panel member to be slid forwardly and lifted from said channel means while being supported thereon for preventing jamming of said first panel member during its pivotal movement about said second panel member, whereby when said first panel member and said second panel member are folded they lie flatly on said bed of said truck.

2. In combination with a pick-up truck having a truck bed and tailgate at one end thereof, a storage cover for a portion of said bed of said truck comprising:
- a first panel member positioned horizontally from side to side across the rear end portion of said bed adjacent to said tailgate of said truck and supported on the side walls of said bed,
- a second panel member secured to a first edge of said first panel member by a hinge connection and having a contour fitting the side walls of said bed when installed therein at an angle downwardly and forwardly from said first edge of said first panel member,
- a recess formed in said bed of said truck adjacent said tailgate for receiving said first panel member and said second panel member, and
- means for hingedly attaching said second panel member to said bed within said recess,
- whereby when said first panel member and said second panel member are folded to lie in parallel planes, one upon the other within said recess for storage purposes, the outermost panel of the folded cover will lie in a plane substantially coplanar with the plane of said bed of said 3. The combination set forth in claim 2 wherein:
said first panel member and said second panel member are formed of rigid material.

4. The combination set forth in claim 2 wherein:
said recess is only slightly larger than the geometrical configuration of the folded first panel member and the second panel member.

5. The combination set forth in claim 2 wherein:
said recess is substantially equal to the length of said first panel member and the second panel member and the width of said recess is substantially equal to the width of said second panel member.

6. The combination set forth in claim 2 in further combination with:
support means comprising a rail operatively disposed on a front surface of said tailgate adjacent to a top edge thereof for supporting said first panel member in a generally horizontal position.

7. In combination with a pick-up truck having a truck bed and a tailgate at one end thereof, a storage cover for a portion of a bed of said truck comprising:
- a first rigid panel member positioned horizontally from side to side across the rear end portion of said bed adjacent to the tailgate of the truck and supported on the side walls of said bed,
- a second rigid panel member secured to a first edge of said first panel member by a hinge connection and having a contour fitting the side walls of said bed when installed therein substantially vertically downwardly and forward from said first edge of said first panel member,
- means for hingedly attaching said second panel member to said bed,
- a third panel member secured to a second edge of said first panel member by a hinge connection and having a length and width substantially equal to said first panel member,
- said third panel member being normally disposed in a vertical position such that its plane is parallel to the plane of said tailgate in its upright position,
- whereby said third panel member completes the storage cover when said tailgate is in its open truck bed position.

8. The combination set forth in claim 7 wherein:
said third panel member is at least partially formed of a mesh-like material for admitting air and light to the enclosure formed by said cover when said tailgate is in an open position.

* * * * *

UNITED STATES PATENT OFFICE
CERTIFICATE OF CORRECTION

Patent No. 4,749,226      Dated June 7, 1988

Inventor(s) Henry R. Heft

It is certified that error appears in the above-identified patent and that said Letters Patent are hereby corrected as shown below:

Claim 1, line 58, cancel "enclosures" and substitute ---enclosure---.

Claim 2, line 28, after "said" second occurrence, insert ---truck.---.

Signed and Sealed this

Eleventh Day of October, 1988

*Attest:*

DONALD J. QUIGG

*Attesting Officer*      *Commissioner of Patents and Trademarks*